(12) United States Patent
Sripathi et al.

(10) Patent No.: US 9,112,634 B2
(45) Date of Patent: Aug. 18, 2015

(54) REDUCING NETWORK ACQUISITION TIME

(71) Applicant: Qualcomm Incorporated, San Diego, CA (US)

(72) Inventors: Prashant Udupa Sripathi, Santa Clara, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 13/669,559

(22) Filed: Nov. 6, 2012

(65) Prior Publication Data

US 2013/0208609 A1 Aug. 15, 2013

Related U.S. Application Data

(60) Provisional application No. 61/597,674, filed on Feb. 10, 2012.

(51) Int. Cl.
*H04J 11/00* (2006.01)
(52) U.S. Cl.
CPC .................................. *H04J 11/0023* (2013.01)
(58) Field of Classification Search
None
See application file for complete search history.

(56) References Cited

U.S. PATENT DOCUMENTS

| 2004/0081121 | A1* | 4/2004 | Xu ................................. | 370/329 |
| 2008/0084817 | A1* | 4/2008 | Beckman et al. ............. | 370/210 |
| 2009/0154446 | A1* | 6/2009 | Adler et al. ................... | 370/350 |
| 2010/0034186 | A1* | 2/2010 | Zhou et al. .................... | 370/344 |
| 2010/0202316 | A1 | 8/2010 | Terasawa et al. | |
| 2010/0248638 | A1* | 9/2010 | Harada et al. .............. | 455/67.11 |
| 2010/0303180 | A1* | 12/2010 | Xiong ............................ | 375/345 |
| 2011/0026651 | A1* | 2/2011 | Bhukania et al. ............. | 375/345 |
| 2011/0090853 | A1* | 4/2011 | Chandramouli et al. ..... | 370/329 |
| 2011/0276851 | A1 | 11/2011 | Nagaraja | |
| 2012/0057654 | A1 | 3/2012 | Morris et al. | |
| 2012/0093025 | A1 | 4/2012 | Pare, Jr. et al. | |
| 2012/0097740 | A1* | 4/2012 | Lamba et al. ................. | 235/380 |
| 2012/0106513 | A1* | 5/2012 | Li et al. ......................... | 370/331 |
| 2012/0129565 | A1* | 5/2012 | Frost et al. .................... | 455/522 |
| 2012/0252446 | A1* | 10/2012 | Reial et al. .................... | 455/434 |
| 2013/0003665 | A1* | 1/2013 | Pelletier et al. ............... | 370/329 |
| 2013/0012138 | A1 | 1/2013 | Zhang et al. | |
| 2013/0069824 | A1* | 3/2013 | Madhani et al. .......... | 342/357.69 |

FOREIGN PATENT DOCUMENTS

| WO | 2004086654 A1 | 10/2004 |
| WO | 2013006653 | 1/2013 |

OTHER PUBLICATIONS

International Search Report and Written Opinion—PCT/US2013/022256—ISA/EPO—May 2, 2013.
Yen, P., et al., "PAPR Reduction for Bandwidth-Aggregated OFDM and SC-FDMA Systems," Wireless Communications and Networking Conference (WCNC), 2011 IEEE 2011-PHY, Mar. 2011, pp. 1363-1368.

* cited by examiner

*Primary Examiner* — Faruk Hamza
*Assistant Examiner* — Tito Pham
(74) *Attorney, Agent, or Firm* — Qualcomm IP Department; James Hunt Yancey, Jr.

(57) ABSTRACT

A method, an apparatus, and a computer program product for wireless communication are provided in which PAPR for an input of an AGC in a wireless receiver is generated. The AGC may provide a gain-controlled signal to a correlator when the PAPR of the input does not exceed the threshold ratio and may clamp the gain of the gain-controlled signal when PAPR of the input is large. A large PAPR may cause termination of search for a signal of interest in a current channel. The search may be resumed in a non-adjacent channel.

37 Claims, 11 Drawing Sheets

REDUCING NETWORK ACQUISITION TIME

CROSS-REFERENCE TO RELATED APPLICATION & PRIORITY CLAIM

This application claims priority to and the benefit of U.S. Provisional Application Ser. No. 61/597,674 entitled "Reducing W-CDMA Acquisition Time" and filed on Feb. 10, 2012, which is expressly incorporated by reference herein in its entirety as if fully set forth below and for all applicable purposes.

TECHNICAL FIELD

Embodiments of the present invention relate generally to communication systems, and more particularly, to wireless communications systems and associated wireless communication components that employ multiple-access technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements to improve bandwidth and user experience.

SUMMARY OF SOME SAMPLE EMBODIMENTS

Embodiments of the present invention address the above-discussed issues as well as others. Summaries of some sample embodiments are provided below. The summaries are not meant to be exhaustive as additional details on features are provided below. The summaries should not be used to limit on constrain the technology claimed in this application.

In an aspect of the disclosure, a method of wireless communication comprises generating a peak power to average power ratio (PAPR) from a plurality of power estimates associated with an input received by an automatic gain controller (AGC) in a wireless receiver. The input may be determined to have no signal of interest when the PAPR exceeds a threshold ratio. A signal of interest may comprise one or more of a pilot signal and a synchronization signal.

In another aspect of the disclosure, the AGC may provide a gain-controlled signal to a correlator when the PAPR of the input does not exceed the threshold ratio. The correlator may be configured to identify the signal of interest in the gain-controlled signal.

In another aspect of the disclosure, the plurality of power estimates relate to a sampling period of 10 milliseconds or more. The input may be determined to comprise no signal of interest when the power of the input signal exceeds a predetermined maximum rate of change for one or more sampling periods.

In another aspect of the disclosure, the signal of interest is transmitted by a base station of a first wireless communication system, and a second wireless communication system transmits control signals in the same frequency band as control signals of the first wireless communication system. The first wireless communications system may be a Universal Mobile Telecommunications System (UMTS) and may use wideband code division multiple access (W-CDMA). The second wireless communications system may be a 3GPP long term evolution (LTE) system. The plurality of power estimates may be obtained by sampling the input signal over a period of time based on a symbol duration of the LTE system. The symbol duration may be 10 milliseconds, 20 milliseconds, or more. The input signal may be sampled at a rate of 15 kHz.

In another aspect of the disclosure, it is determined whether any signal received from a plurality of frequency bands includes the signal of interest. If the signal of interest is determined to be absent from one of the plurality of frequency bands based on high PAPR, then adjacent frequency bands may not be searched for the signal of interest.

In an aspect of the disclosure, a method of wireless communication comprises controlling the output power of an AGC, which receives an input from a wireless receiver, whereby the AGC provides an output having a power level that does not exceed a first threshold power level. A positive decision is generated when a correlator identifies a signal of interest in the input. The current search for the signal of interest is terminated when the power level of the AGC output decreases by more than a second threshold power level.

In another aspect of the disclosure, the signal of interest comprises one or more of a pilot signal and a synchronization signal. In another aspect of the disclosure, the AGC limits a rate of change in gain of the AGC in response to increases in the power of the input. In another aspect of the disclosure, the AGC reduces the gain of the AGC in response to increases in the power of the AGC output. In another aspect of the disclosure, the first threshold power level corresponds to a set-point of the AGC. In another aspect of the disclosure, the power of the input is sampled at a rate of 15 kHz.

In another aspect of the disclosure, one or more of the AGC and the correlator may be configured to terminate the search for the signal of interest when the PAPR of the output signal varies by more than a threshold ratio within a predefined period of time. The predefined period may correspond to the transmission duration of a subframe transmitted by an LTE system. The signal of interest may comprise a signal transmitted by a UMTS base station and where an evolved Node B of an LTE system transmits control signals in the same frequency band as UMTS control signals. The signal of interest may comprise a W-CDMA signal.

In another aspect of the disclosure, a next search may be initiated for the signal of interest when the AGC or the correlator terminates the current search. The next search may be conducted in a channel of the UMTS that is different from the channel searched in the current search. The next search may be conducted in a channel of the UMTS that is not adjacent to the channel searched in the current search.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
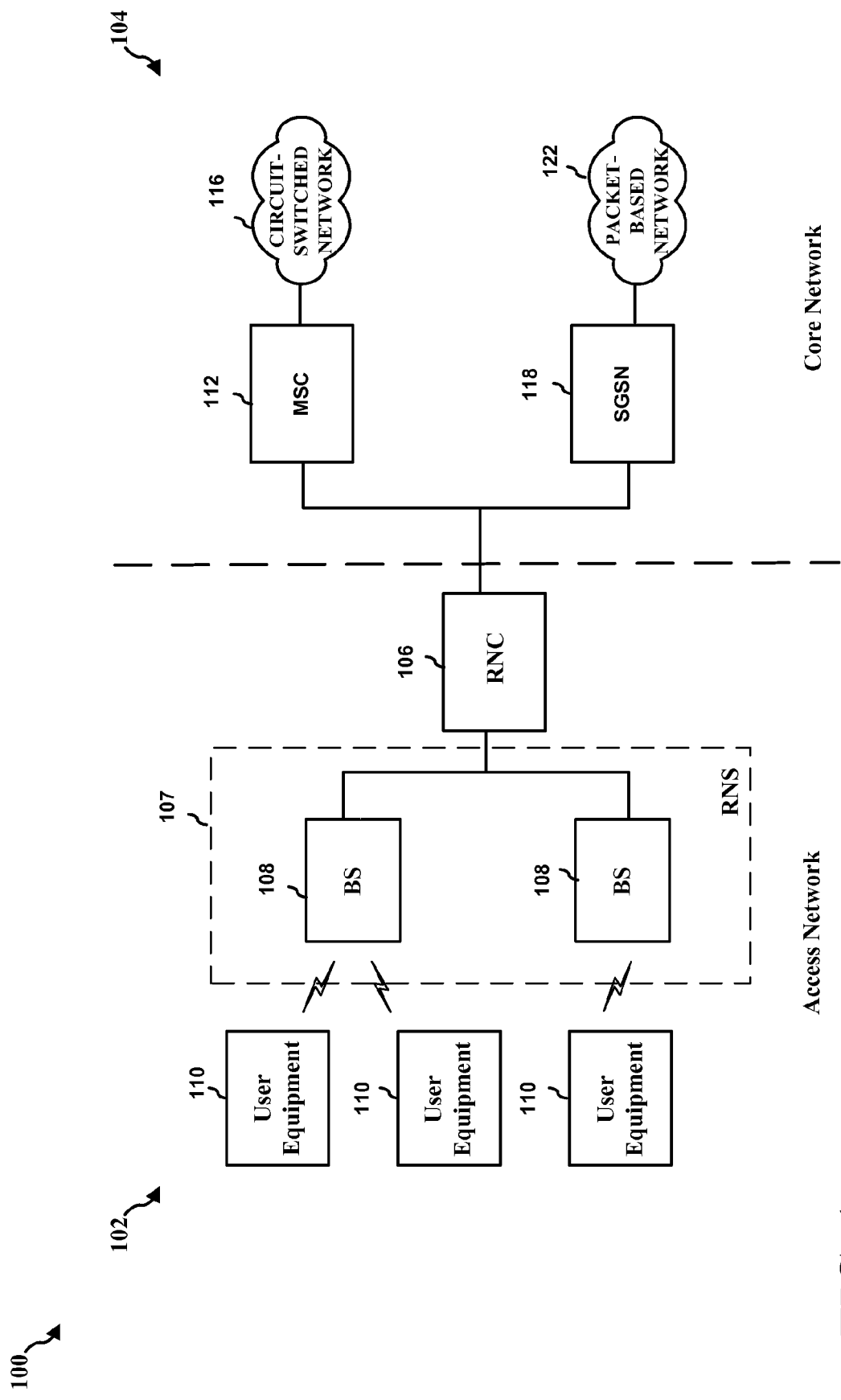
FIG. 1 is a diagram illustrating an example of a network architecture according to some embodiments of the present invention.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various concepts presented throughout this disclosure may be implemented across a broad variety of telecommunication systems, network architectures, and communication standards. By way of example and without limitation, certain aspects of the present disclosure are illustrated in the block schematic 100 of FIG. 1 with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. A GMSC (not shown) may provide a gateway through the MSC 112 for the UE to access a circuit-switched network 116. The GMSC includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC queries the HLR to determine the UE's location and forwards the call to the particular MSC serving that location.

The core network 104 also supports packet-data services with a serving GPRS support node (SGSN) 118 and a gateway GPRS support node (GGSN). GPRS, which stands for General Packet Radio Service, is designed to provide packet-data services at speeds higher than those available with standard GSM circuit-switched data services. The GGSN provides a connection for the RAN 102 to a packet-based network 122. The packet-based network 122 may be the Internet, a private data network, or some other suitable packet-based network. A primary function of the GGSN is to provide the UEs 110 with packet-based network connectivity. Data packets are transferred between the GGSN and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
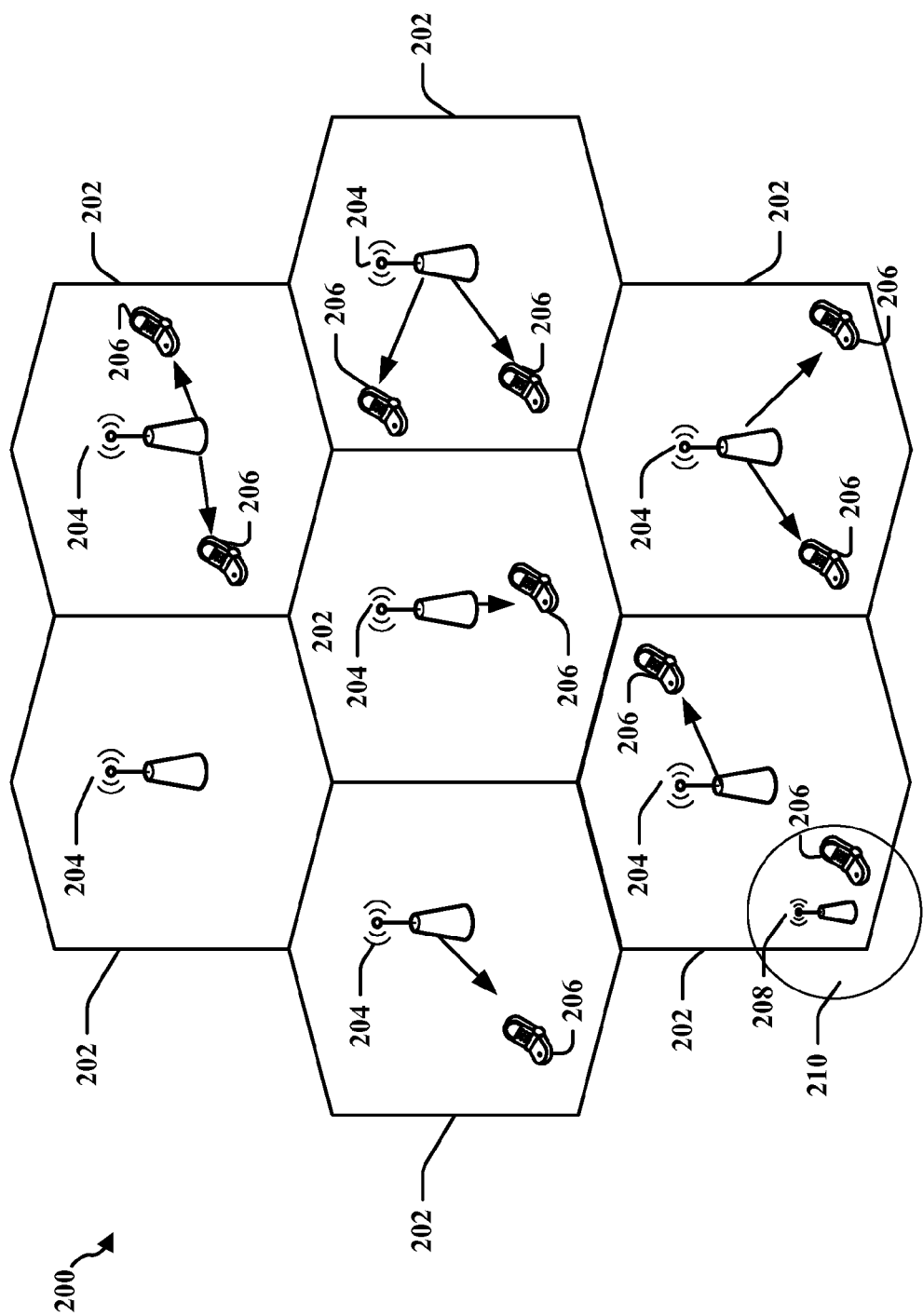
FIG. 2 is a diagram illustrating an example of an access network according to some embodiments of the present invention.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the Evolved Packet Core (EPC) for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing W-CDMA and other variants of CDMA, such as TD-SCDMA; Global System for Mobile Communications (GSM) employing TDMA; and Evolved UTRA (E-UTRA), IEEE 802.11 (Wi-Fi), IEEE 802.16

(WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR) associated with OFDM.

Figure 3:
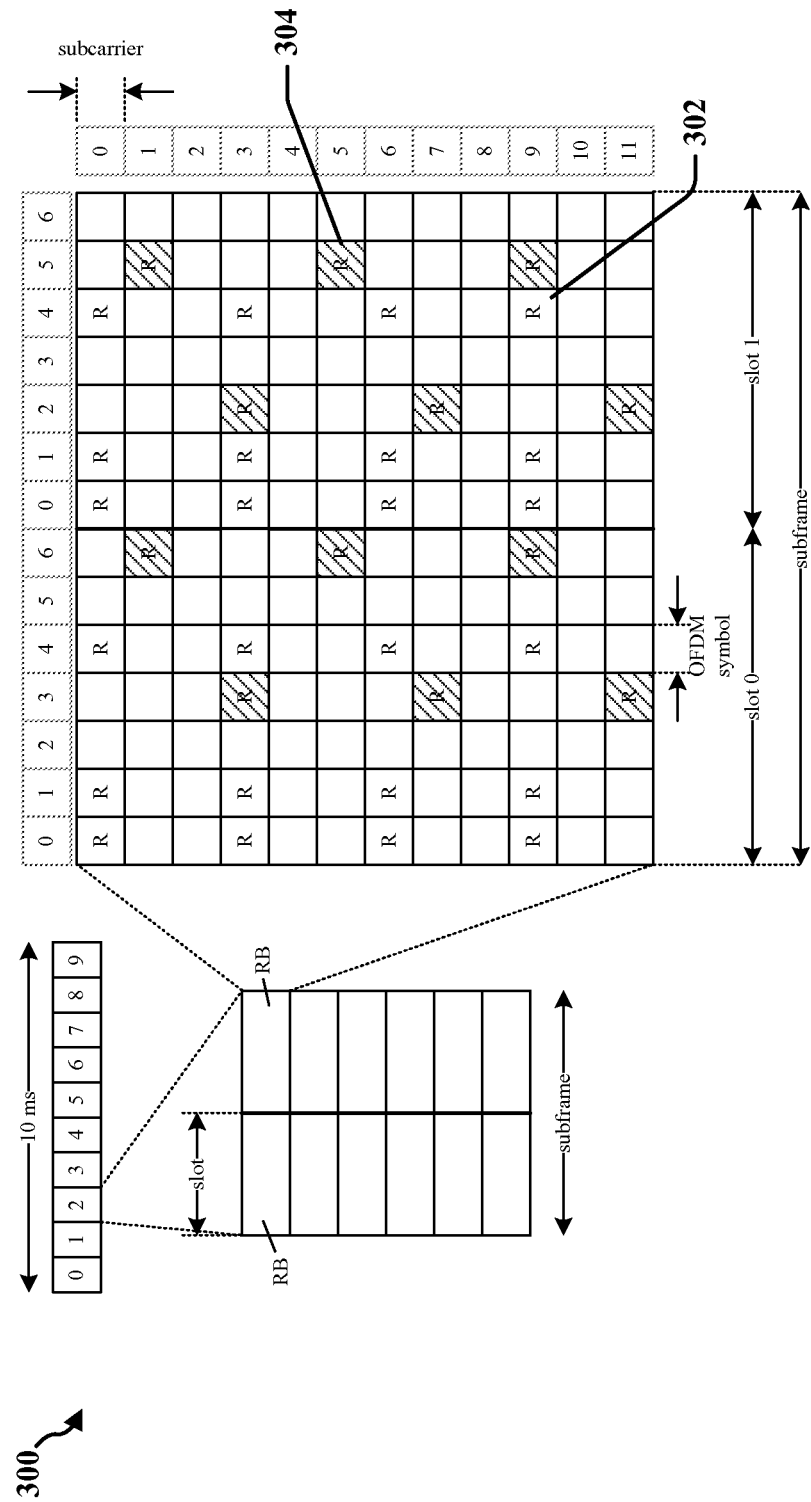
FIG. 3 is a diagram illustrating an example of a downlink frame structure in LTE according to some embodiments of the present invention.

FIG. 3 is a diagram 300 illustrating an example of a DL frame structure used in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
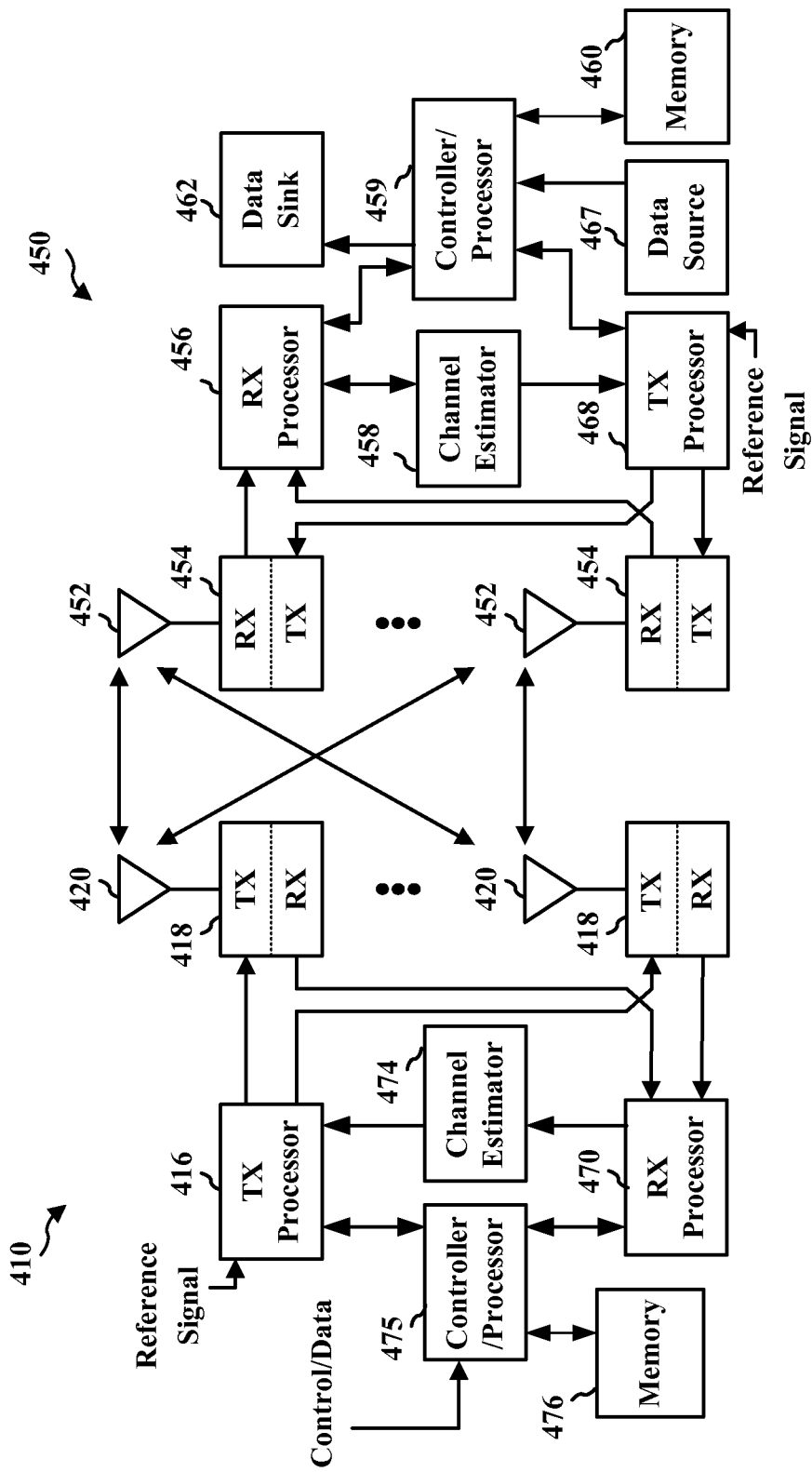
FIG. 4 is a diagram illustrating an example of a base station and user equipment in an access network according to some embodiments of the present invention.

FIG. 4 is a block diagram illustrating a base station, such as an eNB 410 in communication with a UE 450 in an access network. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The transmit (TX) processor 416 implements various signal processing functions for the L1 layer (i.e., physical layer). The signal processing functions includes coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 410. These soft decisions may be based on channel estimates computed by the channel estimator 458. The soft decisions are then decoded and deinterleaved to recover the data and control signals that were originally transmitted by the eNB 410 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the control/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the eNB 410, the controller/processor 459 implements the L2 layer for the user plane and the control plane by providing header compression, ciphering, packet segmentation and reordering, and multiplexing between logical and transport channels based on radio resource allocations by the eNB 410. The controller/processor 459 is also responsible for HARQ operations, retransmission of lost packets, and signaling to the eNB 410.

Channel estimates derived by a channel estimator 458 from a reference signal or feedback transmitted by the eNB 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the eNB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection using an ACK and/or NACK protocol to support HARQ operations.

Figure 5:
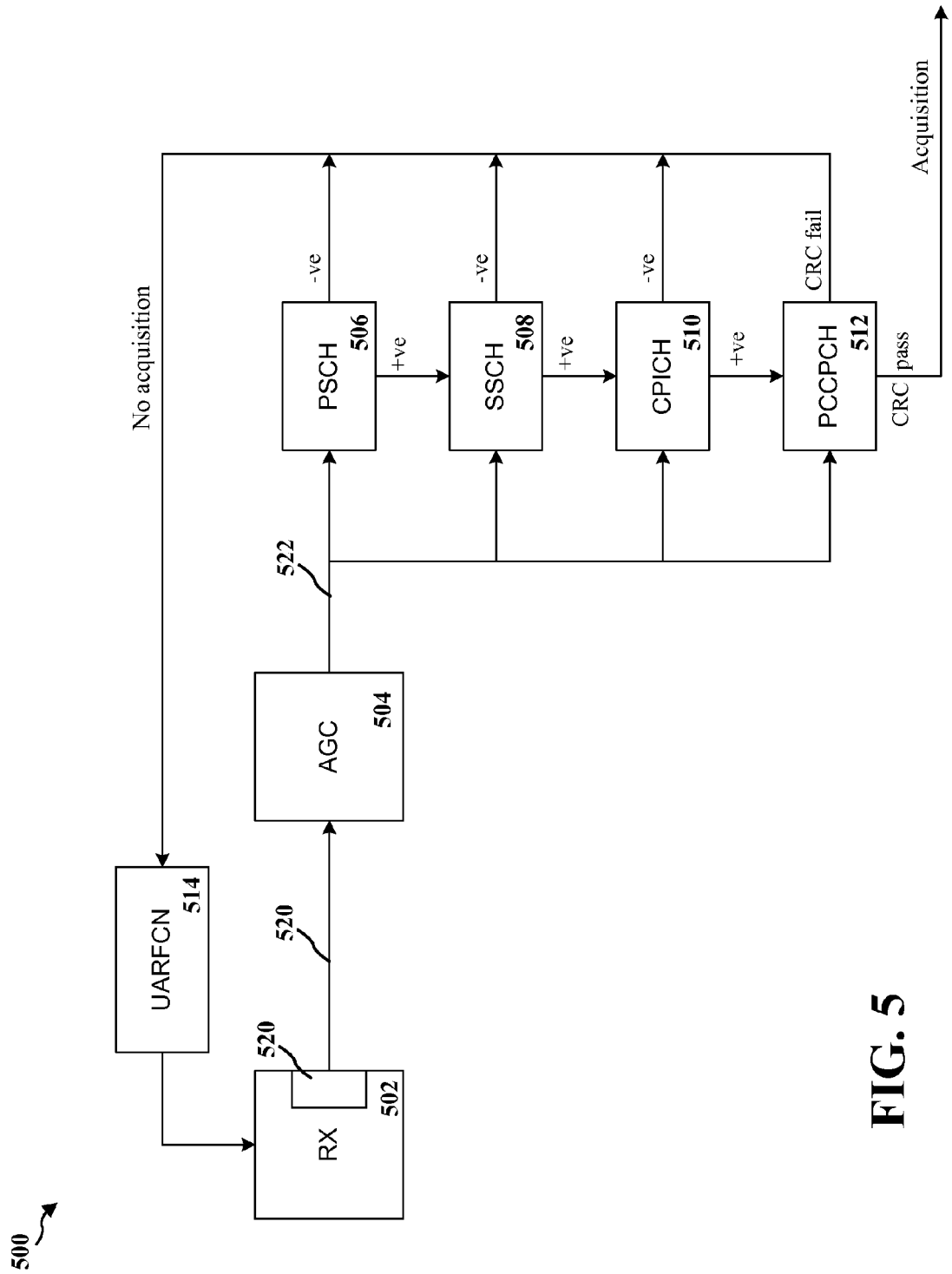
FIG. 5 is a simplified flow diagram illustrating a W-CDMA channel acquisition procedure for a UMTS according to some embodiments of the present invention.

FIG. 5 is a simplified flow diagram illustrating one W-CDMA channel acquisition procedure for a UMTS. Typically, a UE performs a series of system determination procedures after power-up, an out-of-service (OOS) period and during binary pulse length modulation (BPLM) scans. The UE attempts to establish a W-CDMA channel by searching a range of frequencies in multiple supported frequency bands for synchronization and acquisition signals. A W-CDMA search may be performed on many channels in a sequence determined by UTRA absolute radio frequency channel number (UARFCN) 514. For each UARFCN, a W-CDMA search sequence may include a search for a primary synchronization channel (PSCH) 506 to obtain slot timing, a search for secondary synchronization channel (SSCH) 508 for code group and frame timing, a search for common pilot channel (CPICH) 510 to determine scrambling code and fine timing, and a decoding of a primary common control physical channel (PCCPCH) 512 to obtain system information.

Radio receiver 502 may provide a baseband signal 520 representative of the currently selected channel. Each of PSCH 506, SSCH 508 and CPICH 510 may comprise a correlator configured to seek a pilot or synchronizing signal or other signal-of-interest in the current channel. Each correlator may return a positive decision indicating acquisition of the signal sought by the correlator. A negative decision may be returned to indicate that the signal is not present with sufficient power to enable channel acquisition. Receipt of a negative decision may cause abandonment of the search and attempted channel acquisition for the current channel. One or more correlator may produce a positive or negative decision based on the power levels of a detected signal-of-interest in the signal 520 provided by receiver 502.

PCCPCH 512 may comprise a decoder that attempts to extract information from input signal 520, or from power-controlled signal 522, when PSCH 506, SSCH 508, and CPICH 510 indicate availability of timing information and scrambling codes. Information produced by the decoder is typically subjected to a cyclic redundancy check (CRC) and, if the information is determined to have a valid CRC, PCCPCH 512 may indicate that channel acquisition has been accomplished.

In certain embodiments of the present invention, W-CDMA searching can be accelerated by reducing the occurrence of false positives generated when signals transmitted by wireless communication systems other than W-CDMA, including LTE systems. In some embodiments, false positives can be identified based on the performance of receiver AGC. W-CDMA pilot and synchronization signals are expected to have consistent and stable power levels and correlators used in PSCH 506, SSCH 508 and CPICH 510 may be designed to expect stabilized channel signal 520. Consequently, AGC 504 may be used to correct for drift and other low frequency variations that may occur in the power level of signal 520. AGC 504 may provide a stabilized signal 522 that maintains stability of one or more of the peak amplitude and the power of signal 522. The PAPR of signal 522 can be expected to be relatively close to a unitary value (i.e. 1) because an efficient AGC 504 can substantially eliminate variations in the power level of pilot and synchronization components of signal 522.

In contrast, the power level of LTE signals can vary considerably within each subframe and, in particular, LTE downlink signals comprising OFDM signals may exhibit high PAPR. High PAPR may indicate short increases or burst in signal power in both positive (increased power) and negative (decreased power) directions. AGC 504 may have a relatively slow response time and may produce an output that includes transitions above and below the target power output, or set-point of the AGC. Consequently, AGC 504 may produce an output that has significant positive transitions, particularly where the LTE signal transitions from an average power state to a peak power state. A correlator may misinterpret, or be effectively "swamped," by these positive transitions and may produce a false positive when the correlator input power level is significantly higher than expected input power levels. The search may continue until CRC validation errors cause abandonment of the channel.

When an attempted channel acquisition is abandoned for the current channel due to a failure to identify a required pilot or synchronizing signal, or due to a CRC failure, a W-CDMA search may be performed on the next channel, which is typically identified by UARFCN 514. Thousands of channels may be searched for W-CDMA signals when a UE is in a poorly covered geographical area, for example, and false positives may result in a prolonged search that can last for several minutes or more. Consequently, the deployment of new wireless technologies may affect the speed of channel acquisition of W-CDMA channels, which would otherwise be expected to terminate after PSCH search 506 or SSCH 508 search. For example, false positives received due to LTE use of the same frequency bands as W-CDMA may cause prolonged searches.

LTE wireless systems may be a source for false positives generated in W-CDMA searches because LTE can use the same frequency bands used by W-CDMA and because LTE signals can exhibit a high PAPR. The high PAPR may cause AGC 504 to produce an output signal 522 with power that peaks above the power levels expected by correlators in PSCH 506, SSCH 508 and CPICH 510. The high PAPR in LTE may be a result of variability of symbol content and inconsistency of power control signals. PAPR of a baseband signal 520 provided by receiver 502 may be calculated based on samples obtained by a digitizer 520 or other signal processing element of the receiver 502. In UMTS, received signals may be sampled at a rate of 15 kHz. In some embodiments, power estimates may be obtained by AGC 504.

Figure 6:
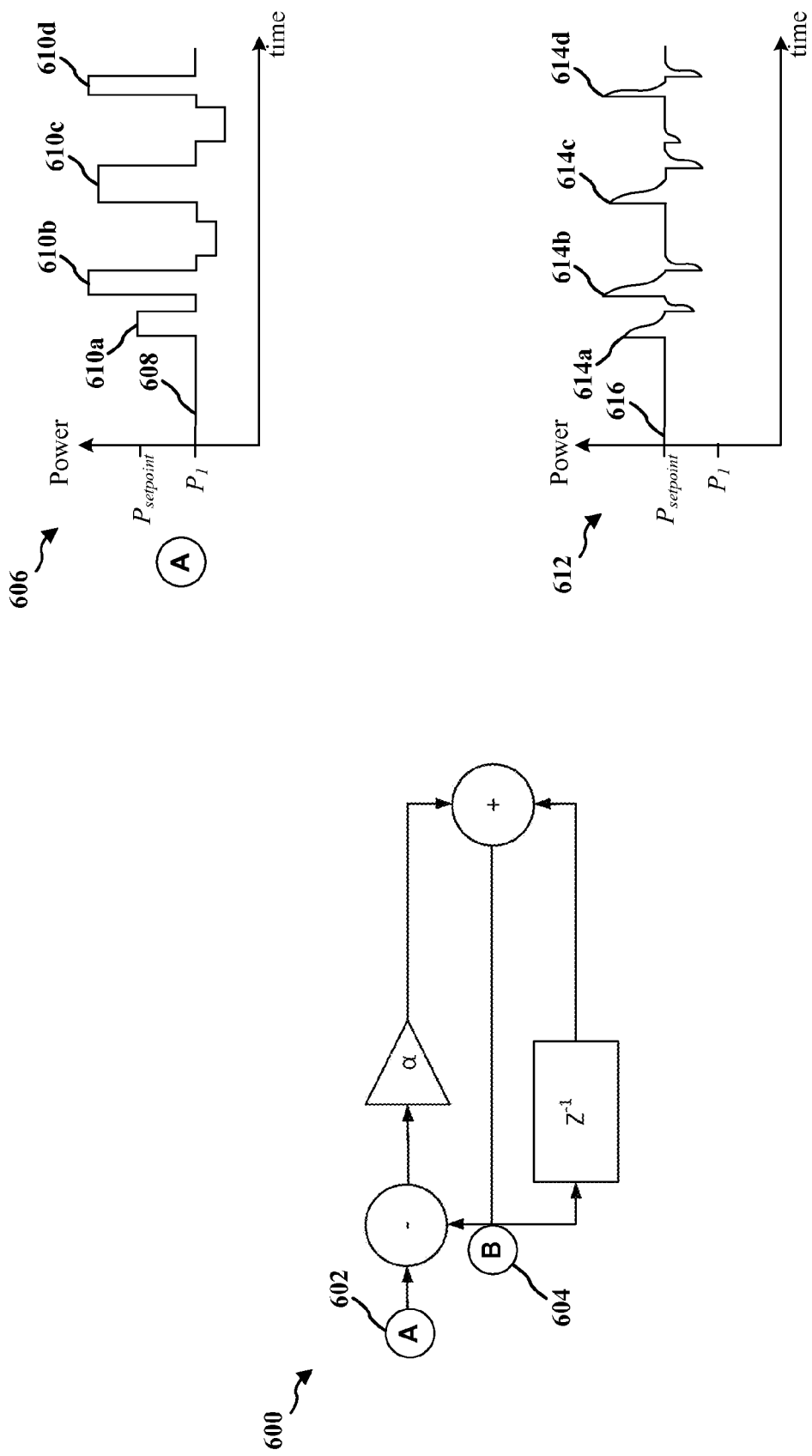
FIG. 6 depicts an input power estimation loop of a receiver AGC according to some embodiments of the present invention.

FIG. 6 depicts an input power estimation loop 600 of a receiver AGC. Input power estimation loop 600 may be configured as a simple closed loop 1-pole infinite impulse response (IIR) filter. The output power of receiver AGC 600 reflects, and may be proportional to, the difference between actual input power 602 and the estimated AGC power 604. AGC 600 may be configured to control output power for stable W-CDMA signals with low PAPR. As shown in the simplified chart 606, however, a high-PAPR LTE signal presented as an input 602 may be characterized by short durations of peak power 610a, 610b, 610c, and 610d at levels significantly higher than average power 608. The average power ($P_1$) 608 of LTE signal may be lower than the power level expected for a W-CDMA gain-controlled signal, which may be referred to as the AGC set point ($P_{setpoint}$) 616. Accordingly, the AGC 600 may increase gain to conform average power 608 of LTE signal 606 to the AGC set-point 616 in AGC output shown in chart 612. As depicted in the simplified example of FIG. 8, AGC 600 responds to periods of increased LTE signal power 610a, 610b, 610c, and 610d and may decrease output power after a delay, but with a relatively slow rate of change. When LTE signal power returns to an average level 608, the power level in output of AGC 600 may spike lower until AGC gain is increased to accommodate LTE signal average power level 608. It will be appreciated that magnitude, shape and duration of peaks 614a, 614b, and 614c may depend on the responsiveness of AGC 600.

While the power levels of the output of AGC 600, as at 612, may not be representative of all AGCs used in W-CDMA receivers, the chart 612 illustrates that a high PAPR signal, such as an LTE signal, may cause the PAPR of the AGC output to increase significantly. Negative transitions of power of LTE signal 602 may be less pronounced, but may further contribute to increases in PAPR. PSCH 506, SSCH 508 and CPICH 510 may generate false positives when output of AGC 600 exhibits increased PAPR or power peaks 614a, 614b, 614c, and 614d and when constant power W-CDMA signals are expected.

Some embodiments employ active PAPR handling to combat false positives caused by LTE and other high-PAPR signals. An AGC may be configured to detect large transitions in gain, rapidly changing power levels in input signal (see chart 606), or output signal power (see chart 612) that exceeds expected output power 616 by a threshold amount. Upon detection of one or more of these conditions, AGC may generate an exception signal that may cause early termination of the search for pilot and synchronization signals in the current channel. In some embodiments, difference signals generated by the AGC may be used to determine that an input signal is not a W-CDMA signal. For example, a comparison of output power to set-point may be used to generate a negative decision. In another example, PAPR or a surrogate of PAPR of the input signal may be compared to a threshold. Thresholds may be statically or dynamically optimized.

Figure 7:
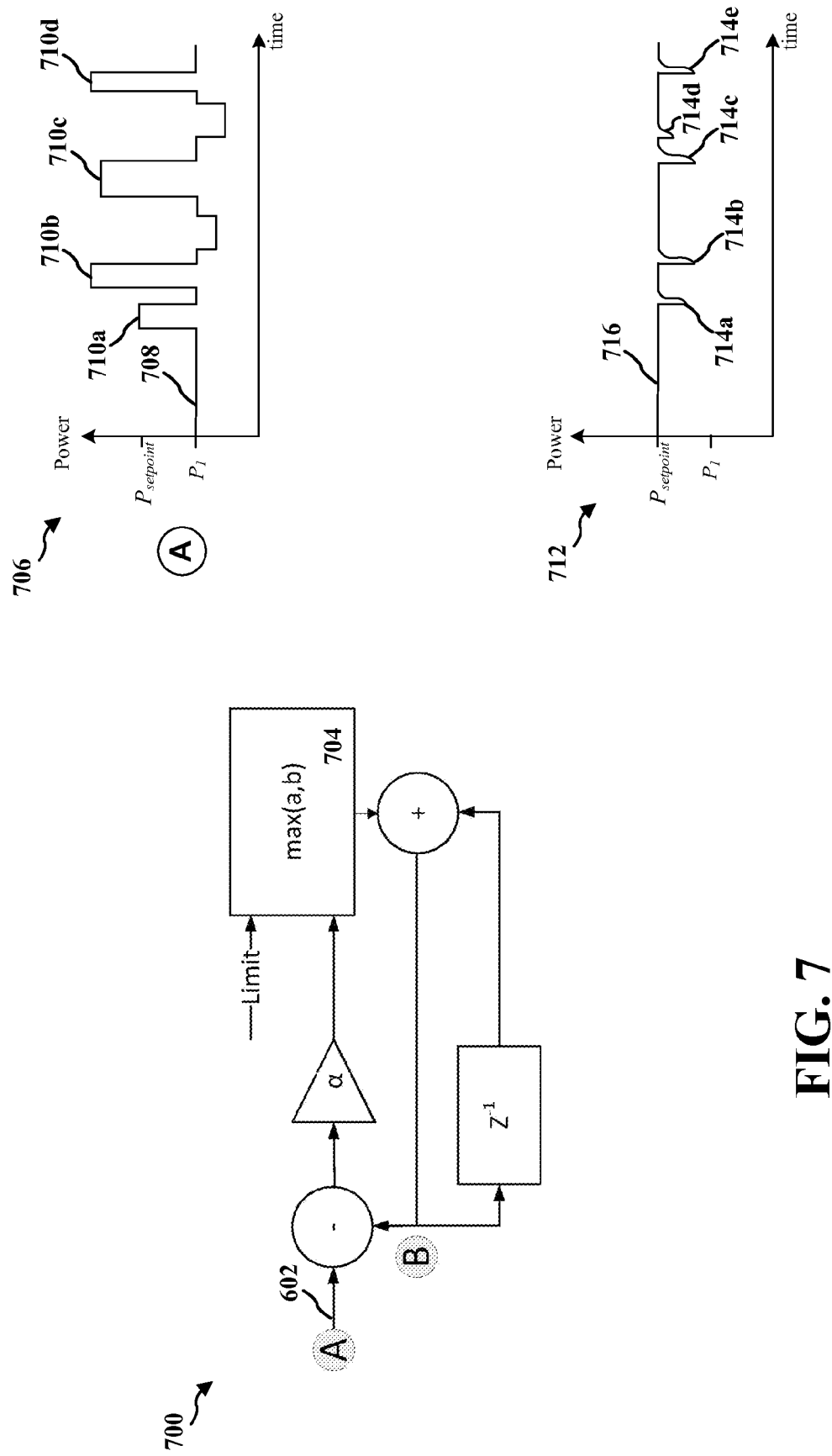
FIG. 7 depicts active PAPR handling in an AGC according to some embodiments of the present invention.

FIG. 7 depicts the use of passive PAPR handling to combat false positives caused by LTE and other high-PAPR signals. Some embodiments employ passive PAPR handling to limit or suppress excursions of AGC output power above AGC set-point 716. In one example, AGC input power estimation loop 700 may be modified by addition of limiter 704 to ensure that the power estimate does not drop too quickly. As noted, the output power of receiver AGC 600 may be proportional to the difference between actual input power 602 and the estimated AGC power 604 In some embodiments, limiter 704 may be configured to clamp output power of the AGC, effectively reducing gain as soon as power increases are detected in input signal 602, where such power increases would increase the power of the AGC output to levels above a threshold value. The threshold value may be greater than the set-point of the AGC. Threshold values may be selected to optimize correlator performance in PSCH 506, SSCH 508, and CPICH 510. In one example, the threshold value may be the set-point $P_{setpoint}$ 716 of the AGC.

Clamping power level in a signal provided to correlators may significantly reduce the incidence of false positives generated by the correlators. In some embodiments, transitions in signal power below the maximum level may still be observed for high PAPR signals and these transitions may be used to terminate searches for W-CDMA signals. The AGC may respond more slowly to decreases in signal power and the output of the AGC may exhibit an increased PAPR when an LTE signal is present. One or more of the PSCH 506, SSCH 508, and CPICH 510, the AGC itself or another device or module may be configured to terminate a search for W-CDMA when a high PAPR AGC output, rapid transitions in power of the AGC output or decreases in power levels in the AGC output is detected.

In some embodiments, the search for a W-CDMA channel may be accelerated by bypassing certain channels when an interfering signal is discovered in a neighboring channel. The presence of a non-W-CDMA signal in one channel may indicate that the non-W-CDMA signal will also be detected in an adjacent channel. The search may be accelerated by refraining from conducting a search in channels that are adjacent to channels having signals exhibiting high PAPR.

Figure 8:
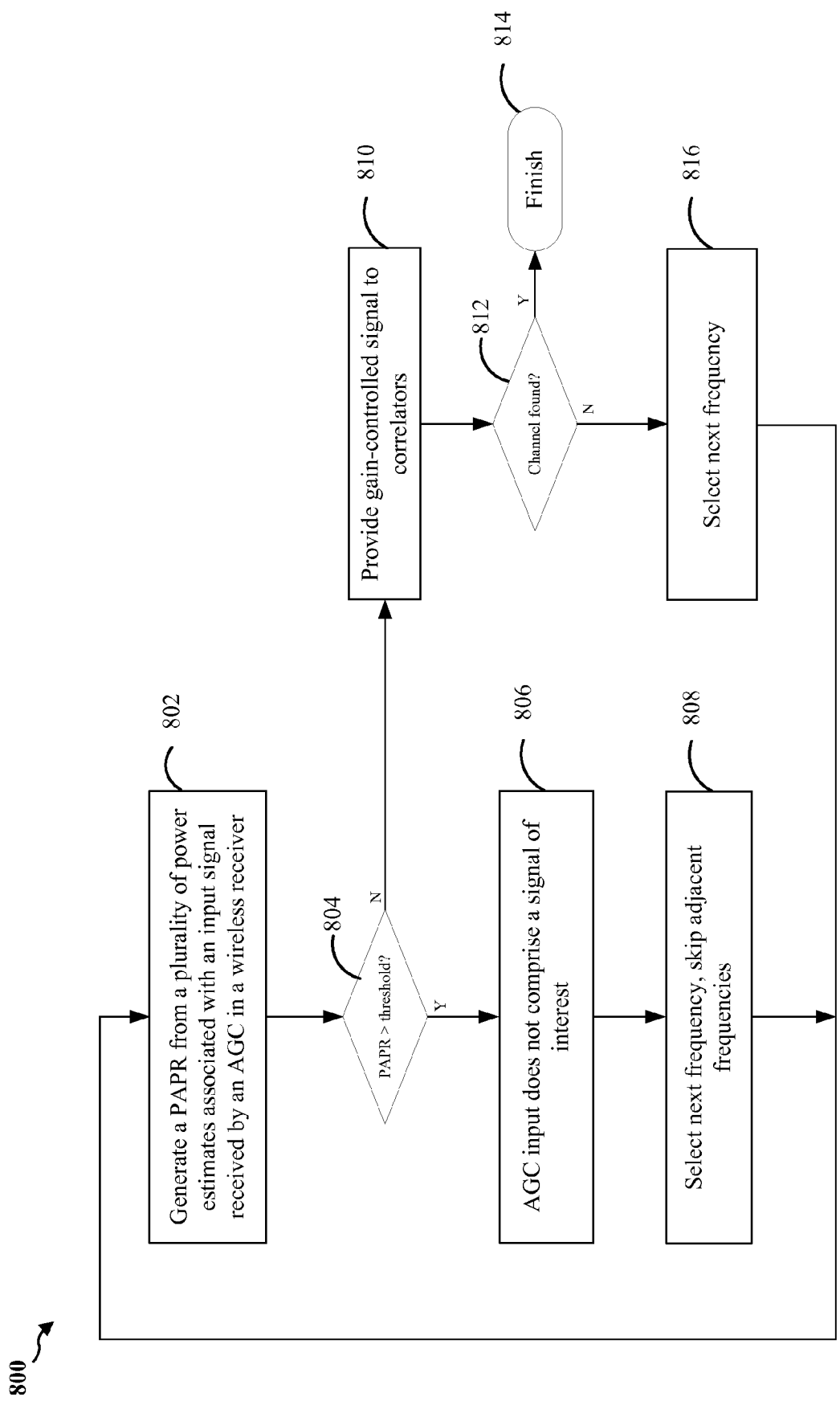
FIG. 8 is a flow chart of a method of wireless communication according to some embodiments of the present invention.

FIG. 8 is a flow chart 800 of a method of wireless communication. The method may be performed by a UE. At step 802, the UE generates a PAPR from a plurality of power estimates associated with an input signal received by an AGC 504 (FIG. 5) in a wireless receiver. Power estimates may be obtained from samples taken of a received signal. PAPR may also be determined by the AGC 504. At step 804, the UE determines whether the PAPR exceeds a threshold ratio. If the AGC exceeds the threshold, then the UE may determine that the input signal does not comprise a signal of interest at step 806. In one example, a signal 606 (see FIG. 6) transmitted in an LTE system may have elevated PAPR. If the PAPR does not exceed the threshold, then the output of the AGC may be provided at step 810 to one or more correlators (e.g. in searchers 506, 508 and 510 of FIG. 10). Output of AGC 504 may be characterized as a gain-controlled signal. One or more correlators may be configured to identify the signal of interest in the gain-controlled signal where the signal of interest comprises one or more of a pilot signal and a synchronization signal.

At step 812, if the correlators identify signals of interest and PCCPCH 512 decoded data with a valid CRC, then the UE may acquire the channel and terminate the search process at step 814. However, if the PAPR exceeded the threshold at step 804, or if the UE does not find the channel at step 812, the UE may continue the search by selecting a next channel to search at step 808 or step 816. At step 808 the UE may refrain from searching a frequency band adjacent to a first frequency band for the signal of interest subsequent to determining that a signal received from the first frequency band does not comprise the signal of interest based on PAPR levels. The UE may perform step 808 when interference is expected between adjacent channels may occur when an LTE signal is transmitted in one of the channels.

In some embodiments, the plurality of power estimates are obtained from samples taken during a sampling period of 10 milliseconds or more, corresponding to a symbol or subframe transmission duration of an LTE signal. LTE symbol or subframe duration may extend to 20 milliseconds or more and the sampling period may be extended accordingly. Within the sampling period, the sampling rate may be 15 kHz or some other rate used for W-CDMA or other wireless systems.

In some embodiments, the input signal is determined not to comprise the signal of interest when the power of the input signal exceeds a predetermined maximum rate of change for one or more sampling periods.

In some embodiments, the signal of interest is transmitted by a base station of a first wireless communication system such as a UMTS, while the a second wireless communication system (e.g. LTE) transmits control signals in the same frequency band as control signals of the first wireless communication system. The first wireless communications system may employ W-CDMA.

Figure 9:
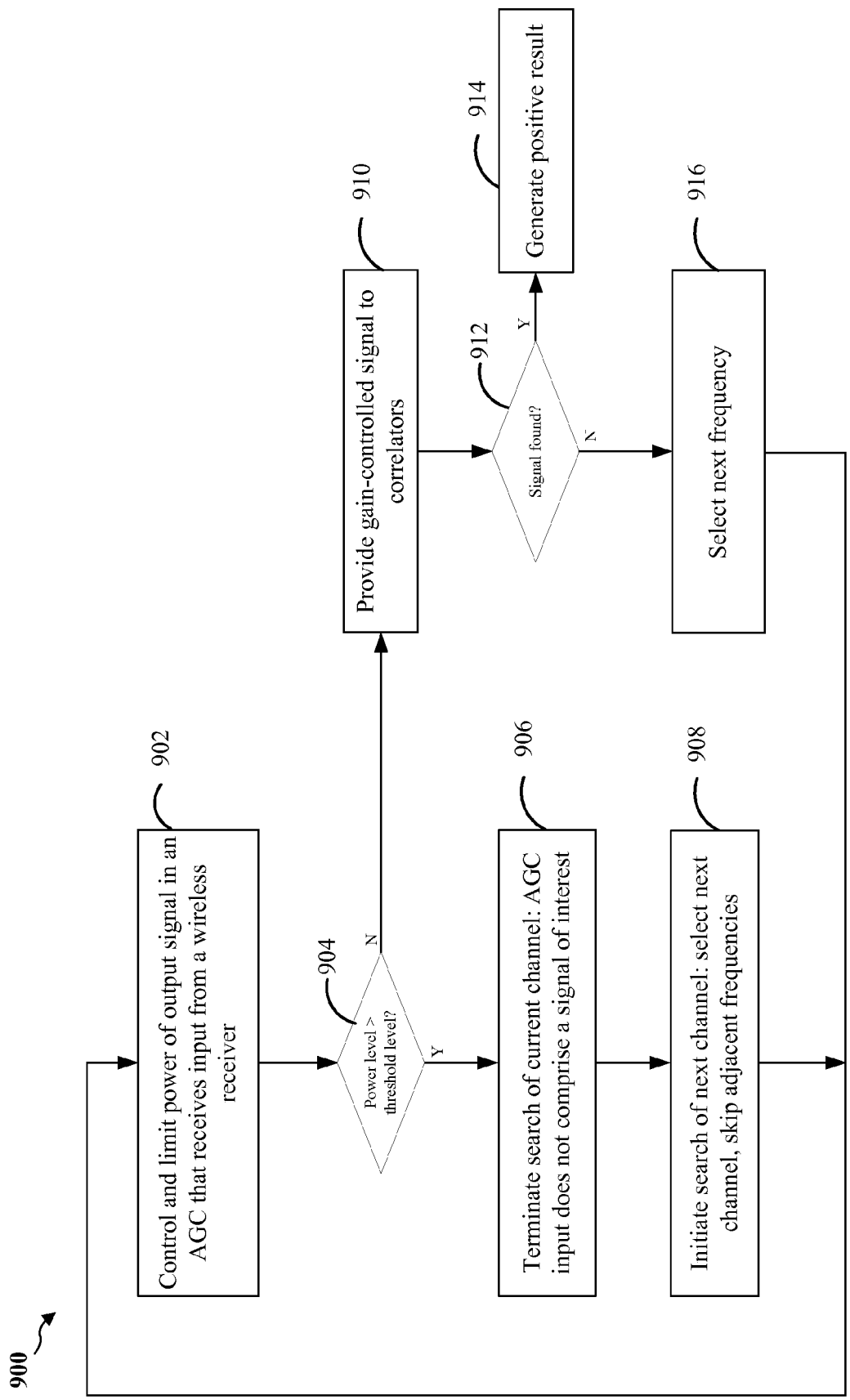
FIG. 9 is a flow chart of a method of wireless communication according to some embodiments of the present invention.

FIG. 9 is a flow chart 900 of a method of wireless communication. The method may be performed by a UE. At step 902, the UE may control and limit power of output signal 522 of an AGC 504 that receives input 520 from a wireless receiver 502. At step 902, the UE determines whether the power level of the input signal 520 or output 522 exceeds a corresponding threshold value. In some embodiments, the power level may be assessed using PAPR.

At step 910, the UE passes the output 522 to searchers that attempt to identify one or more signals of interest. For example, PSCH 506, SSCH 508, and CPICH 510 may use correlators to find a timing signal or a synchronizing signal, while PCCPCH 512 may use CRC techniques to validate information decoded from the signal.

At step 906, the UE may terminate a current search for the signal of interest when the power level of the AGC 504 output decreases by more than a minimum threshold power level (or maximum change threshold). At step 914, the UE may determine that a channel has been acquired when PSCH 506, SSCH 508, CPICH 510, and PCCPCH 512 generate a positive decision after a correlator identifies a signal of interest in the input or a valid CRC is decoded.

In some embodiments, the signal of interest comprises one or more of a pilot signal and a synchronization signal. In some embodiments, the AGC 504 limits a rate of change in gain of the AGC 504 in response to increases in the power of the input 520. The AGC 504 may reduce the gain of the AGC 504 in response to increases in the power of the AGC output 522. In some embodiments, the first threshold power level corresponds to a set-point of the AGC 504. In some embodiments power of the input 520 is sampled at a rate of 15 kHz.

At step 908, the UE may terminate the search for the signal of interest through one or more of the AGC 504 and a correlator (e.g., PSCH 506, SSCH 508, or CPICH 510) determines that the PAPR of the output signal 522 varies by more than a threshold ratio within a predefined period of time. In one example, the predefined period of time corresponds to the transmission duration of a subframe transmitted by an LTE system.

In some embodiments, the signal of interest comprises a signal transmitted by a base station of a UMTS while an eNB of an LTE system transmits control signals in the same frequency band as control signals of the UMTS. The signal of interest may comprise a wideband code division multiple access W-CDMA signal.

At steps 908 and 916, the UE initiates a new search. At step 908, the UE initiates a next search for the signal of interest after the AGC 504 terminates the search, or one or more searcher 506, 508, 510, or 512 terminates the current search, based on PAPR-related issues indicating the presence of an LTE signal. When the search is terminated for PAPR reasons, the UE may determine that the next search is to be conducted in a channel of the UMTS that is not adjacent to the channel searched in the current search. At step 916, the current search may be terminated, for example, because a searcher 506, 508, or 510 did not find the synchronizing or pilot signal sought or PCCPCH 512 did not find valid data using CRC checking. The next search is conducted in a channel of the UMTS that is different from the channel searched in the current search.

Figure 10:
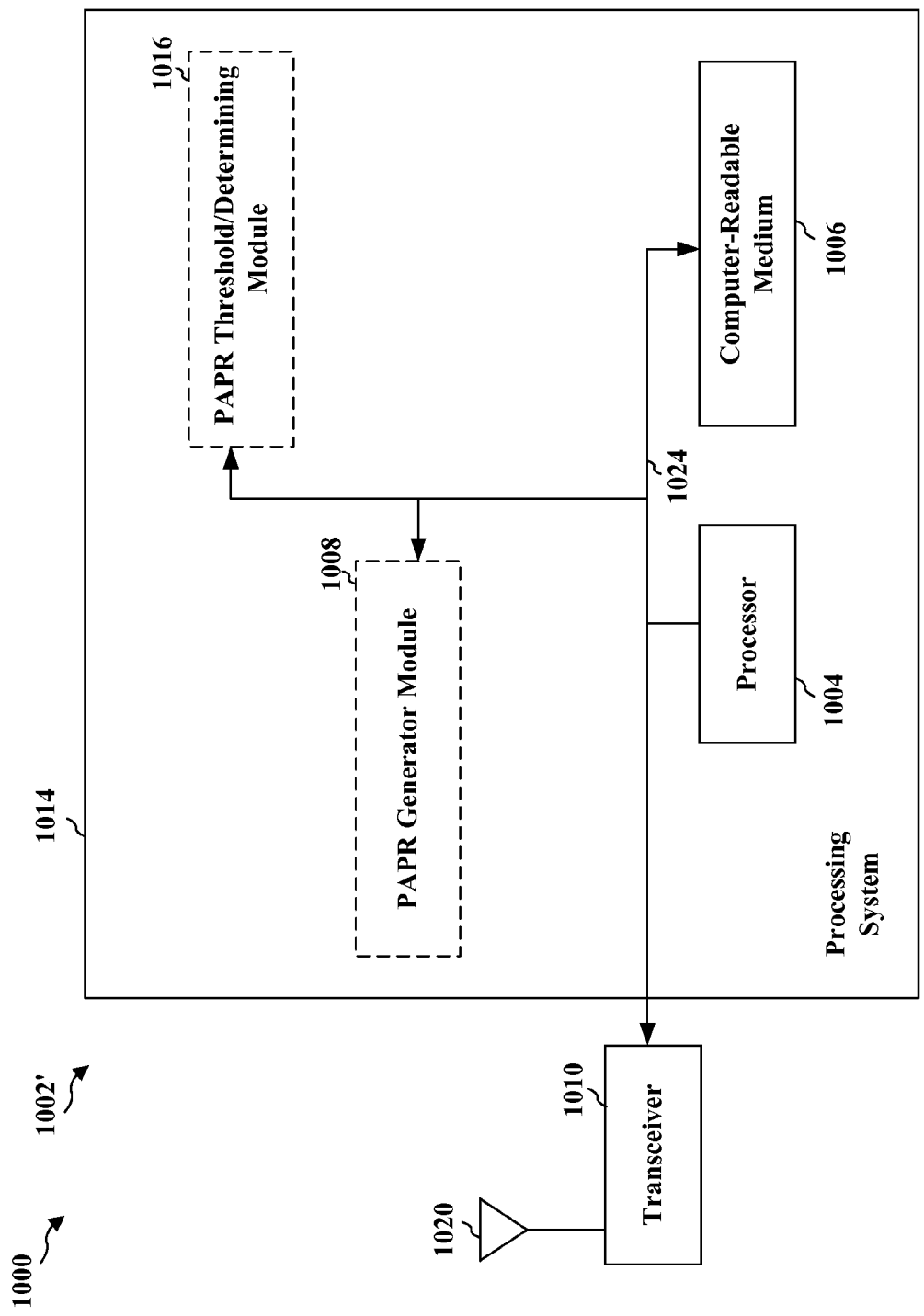
FIG. 10 is a diagram illustrating an example of a hardware implementation for an apparatus employing a processing system according to some embodiments of the present invention.

FIG. 10 is a diagram illustrating an example of a hardware implementation for an apparatus 1002' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 1008 and 1016 and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 1008 and 1016. The modules may be software modules running in the processor 1004, resident/stored in the computer readable medium 1006, one or more hardware modules coupled to the processor 1004, or some combination thereof. The processing system 1014 may be a component of the UE 450 and may include the memory 460 and/or at least one of the TX processor 468, the RX processor 456, and the controller/processor 459.

In one configuration, the apparatus 1002/1002' for wireless communication includes means 1008 for generating a PAPR from a plurality of power estimates associated with an input signal received by an AGC in a wireless receiver. Power estimates may be obtained from samples of a received signal. PAPR may also be obtained by the AGC 504.

In one configuration, the apparatus 1002/1002' for wireless communication includes means 1016 for determining that the input signal does not comprise a signal of interest when the PAPR exceeds a threshold ratio. The signal of interest may comprise one or more of a pilot signal and a synchronization signal. If the AGC exceeds the threshold, then the UE may determine that the input signal does not comprise a signal of interest. In one example, a signal 606 (see FIG. 6) transmitted in an LTE system may have elevated PAPR. If the PAPR does not exceed the threshold, then the output of the AGC may be provided to one or more correlators (e.g. in searchers 506, 508 and 510 of FIG. 5). Output of AGC 504 may be characterized as a gain-controlled signal. One or more correlators may be configured to identify the signal of interest in the gain-controlled signal where the signal of interest comprises one or more of a pilot signal and a synchronization signal.

If the correlators identify signals of interest and PCCPCH 512 has decoded data with a valid CRC, then the UE may acquire the channel and terminate the search process. However, if the PAPR exceeded the threshold, or the UE does not find the channel, the UE may continue the search by selecting a next channel to search. The UE may refrain from searching a frequency band adjacent to a first frequency band for the signal of interest subsequent to determining that a signal received from the first frequency band does not comprise the signal of interest based on PAPR levels. The UE may skip one or more adjacent channels when interference is expected between adjacent channels may occur when an LTE signal is transmitted in one of the channels.

In some embodiments, the plurality of power estimates are obtained from samples taken during a sampling period of 10 milliseconds or more, corresponding to a symbol or subframe transmission duration of an LTE signal. LTE symbol or subframe duration may extend to 20 milliseconds or more and the sampling period may be extended accordingly. Within the sampling period, the sampling rate may be 15 kHz or some other rate used for W-CDMA or other wireless systems.

In some embodiments, the input signal is determined not to comprise the signal of interest when the power of the input signal exceeds a predetermined maximum rate of change for one or more sampling periods.

In some embodiments, the signal of interest is transmitted by a base station of a first wireless communication system such as a UMTS, while the second wireless communication system (e.g. LTE) transmits control signals in the same frequency band as control signals of the first wireless communication system. The first wireless communications system may employ W-CDMA.

The aforementioned means may be one or more of the aforementioned modules of the apparatus 1002 and/or the processing system 1014 of the apparatus 1002' configured to perform the functions recited by the aforementioned means. As described supra, the processing system 1014 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 11:
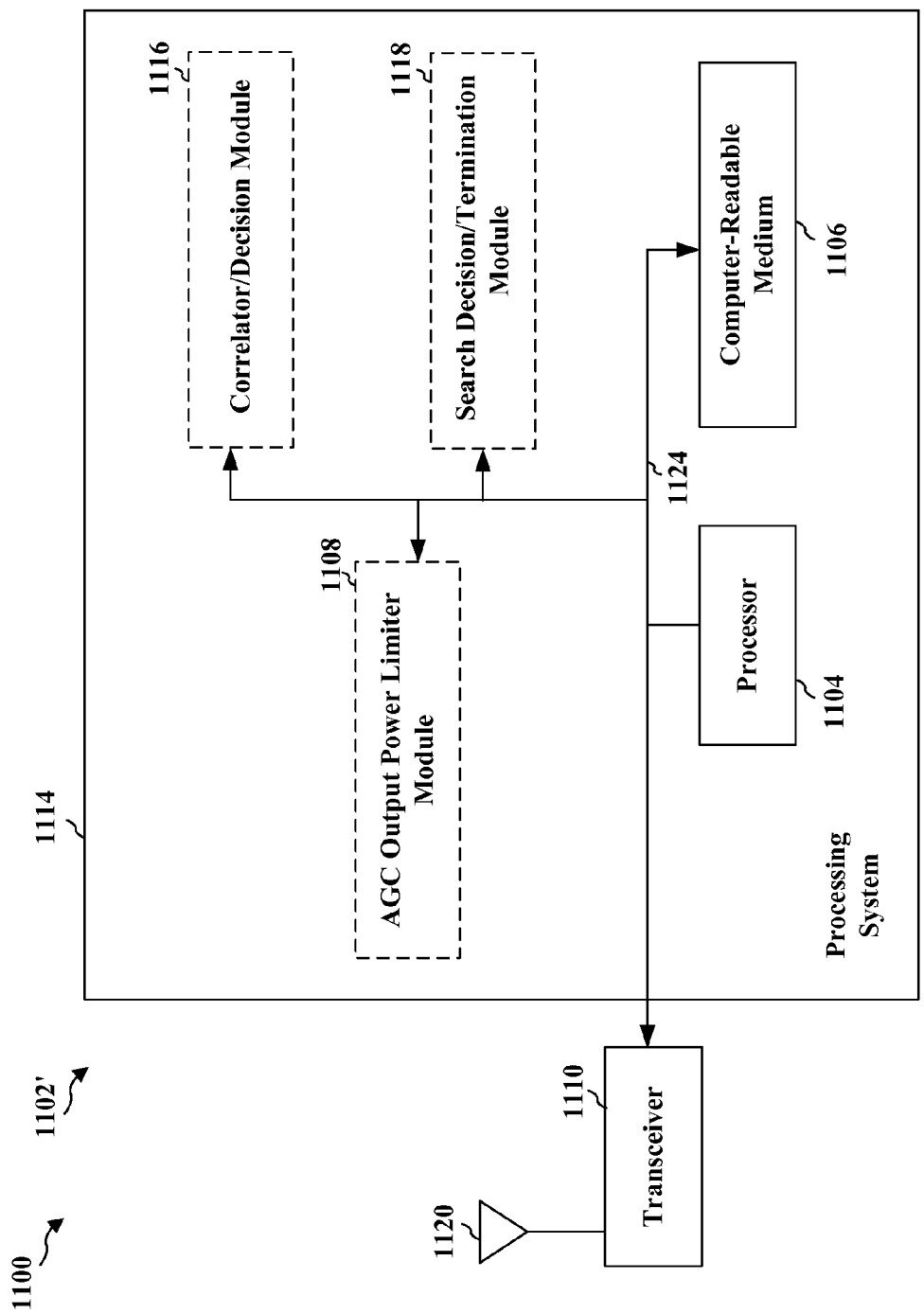
FIG. 11 is a diagram illustrating an example of a hardware implementation for an apparatus employing a processing system according to some embodiments of the present invention.

FIG. 11 is a diagram illustrating an example of a hardware implementation for an apparatus 1102' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1108 and 1116 and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1108 and 1116. The modules may be software modules running in the processor 1104, resident/stored in the computer readable medium 1106, one or more hardware modules coupled to the processor 1104, or some combination thereof. The processing system 1114 may be a component of the UE 450 and may include the memory 460 and/or at least one of the TX processor 468, the RX processor 456, and the controller/processor 459.

In one configuration, the apparatus 1102/1102' for wireless communication includes means 1108 (see also 704, FIG. 7) for controlling the output power of an AGC 700, wherein the AGC receives an input from a wireless receiver and the AGC 700 is configured to provide an output having a power level that does not exceed a first threshold power level. The UE may control and limit power of output signal 522 of an AGC 504 that receives input 520 from a wireless receiver 502.

In one configuration, the apparatus 1102/1102' for wireless communication includes means 1116 for generating a positive decision when a correlator identifies a signal of interest in the input. For example, the UE may pass the output 522 to searchers that attempt to identify one or more signals of interest. For example, PSCH 506, SSCH 508, and CPICH 510 may use correlators to find a timing or synchronizing signal, while PCCPCH 512 may use CRC techniques to validate information decoded from the signal.

In one configuration, the apparatus 1102/1102' for wireless communication includes means 1118 for terminating a current search for the signal of interest when the power level of the AGC output decreases by more than a second threshold power level. The UE may determine whether the power level of the input signal 520 or output 522 exceeds a corresponding threshold value. In some embodiments, the power level may be assessed using PAPR. The UE may terminate a current search for the signal of interest when the power level of the AGC 504 output decreases by more than a minimum threshold power level (or maximum change threshold). The UE may determine that a channel has been acquired when PSCH 506, SSCH 508, CPICH 510, and PCCPCH 512 generate a positive decision after a correlator identifies a signal of interest in the input or a valid CRC is decoded.

In some embodiments, the signal of interest comprises one or more of a pilot signal and a synchronization signal. In some embodiments, the AGC 504 limits a rate of change in gain of the AGC 504 in response to increases in the power of the input 520. The AGC 504 may reduce the gain of the AGC 504 in response to increases in the power of the AGC output 522. In some embodiments, the first threshold power level corresponds to a set-point of the AGC 504. In some embodiments power of the input 520 is sampled at a rate of 15 kHz.

The UE may terminate the search for the signal of interest through one or more of the AGC 504 and a correlator (e.g., PSCH 506, SSCH 508, or CPICH 510) determines that the PAPR of the output signal 522 varies by more than a threshold ratio within a predefined period of time. In one example, the predefined period of time corresponds to the transmission duration of a subframe transmitted by an LTE system.

In some embodiments, the signal of interest comprises a signal transmitted by a base station of a UMTS while an eNB of an LTE system transmits control signals in the same frequency band as control signals of the UMTS. The signal of interest may comprise a wideband code division multiple access W-CDMA signal.

The UE may initiate a new search. For example, the UE initiates a next search for the signal of interest after the AGC 504 or one or more searcher 506, 508, 510, or 512 terminates the current search, typically because of PAPR-related issues indicating the presence of an LTE signal. In such an instance, the UE determines that the next search is conducted in a channel of the UMTS that is not adjacent to the channel searched in the current search. The current search may be terminated, for example, because a searcher 506, 508, or 510 did not find the synchronizing or pilot signal sought or PCCPCH 512 did not find valid data using CRC checking. The next search is conducted in a channel of the UMTS that is different from the channel searched in the current search.

The aforementioned means may be one or more of the aforementioned modules of the apparatus 1102 and/or the processing system 1114 of the apparatus 1102' configured to perform the functions recited by the aforementioned means. As described supra, the processing system 1114 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

We claim:

1. A method of wireless communication, comprising:
generating a peak power to average power ratio (PAPR) from a plurality of power estimates associated with an input signal received by an automatic gain controller (AGC) in a wireless receiver, wherein a first wireless communication standard according to which the input signal was transmitted is unknown when received;
determining that the PAPR associated with the input signal is less than or equal to a threshold ratio;
identifying the first wireless communication standard based on a determination that the PAPR associated with the input signal is less than or equal to the threshold ratio; and
providing, based on identifying the first wireless communication standard, a gain-controlled signal associated with the input signal to a correlator, wherein the correlator is configured to identify the input signal in the gain-controlled signal.

2. The method of claim 1, further comprising determining that the input signal was transmitted by a wireless communication standard other than the first wireless communication standard when the PAPR associated with the input signal exceeds the threshold ratio.

3. The method of claim 1, wherein the plurality of power estimates correspond to a sampling period of 10 milliseconds or more.

4. The method of claim 1, further comprising determining that the input signal was transmitted by a wireless communication standard other than the first wireless communication standard when the power of the input signal exceeds a predetermined maximum rate of change for one or more sampling periods.

5. The method of claim 1, wherein the input signal is transmitted by a first base station that is part of a first wireless communication system, and wherein a second wireless communication system transmits control signals in the same frequency band as control signals of the first wireless communication system.

6. The method of claim 5, wherein the first wireless communication system is a Universal Mobile Telecommunications System (UMTS).

7. The method of claim 5, wherein the first wireless communication system uses wideband code division multiple access (W-CDMA).

8. The method of claim 5, wherein the second wireless communication system is a 3GPP long term evolution (LTE) system.

9. The method of claim 8, wherein the plurality of power estimates is obtained by sampling the input signal over a period of time corresponding to a symbol duration of the LTE system.

10. The method of claim 9, wherein the symbol duration is 10 milliseconds.

11. The method of claim 10, wherein the input signal is sampled at a rate of 15 kHz.

12. The method of claim 9, wherein the symbol duration is at least 20 milliseconds.

13. The method of claim 1, further comprising:
receiving signals in a plurality of frequency bands, the plurality of frequency bands including a first frequency band and a second frequency band adjacent to the first frequency band;

determining that a first signal received in the first frequency band was transmitted using a second wireless communication standard other than the first wireless communication standard; and refraining from searching the second frequency band based on determining that the first signal was transmitted using the second wireless communication standard.

14. The method of claim 1, wherein the threshold ratio is dynamically optimized.

15. The method of claim 1, wherein the input signal comprises at least one of a pilot signal or a synchronization signal.

16. An apparatus for wireless communication, comprising:
means for generating a peak power to average power ratio (PAPR) from a plurality of power estimates associated with an input signal received by an automatic gain controller (AGC) in a wireless receiver, wherein a first wireless communication standard according to which the input signal was transmitted is unknown when received;
means for determining that the PAPR associated with the input signal is less than or equal to a threshold ratio;
means for identifying the first wireless communication standard based on a determination that the PAPR associated with the input signal is less than or equal to the threshold ratio; and
means for providing, based on identifying the first wireless communication standard, a gain-controlled signal associated with the input signal to a correlator, wherein the correlator is configured to identify the input signal in the gain-controlled signal.

17. The apparatus of claim 16, further comprising means for determining that the input signal was transmitted by a wireless communication standard other than the first wireless communication standard when the PAPR associated with the input signal exceeds the threshold ratio.

18. The apparatus of claim 16, wherein the plurality of power estimates relate to a sampling period of 10 milliseconds or more.

19. The apparatus of claim 16, further comprising means for determining that the input signal was transmitted by a wireless communication standard other than the first wireless communication standard when the power of the input signal exceeds a predetermined maximum rate of change for one or more sampling periods.

20. The apparatus of claim 16, wherein the input signal is transmitted by a first base station that is part of a first wireless communication system, and wherein a second wireless communication system transmits control signals in the same frequency band as control signals of the first wireless communication system.

21. The apparatus of claim 20, wherein the first wireless communication system is a Universal Mobile Telecommunications System (UMTS).

22. The apparatus of claim 20, wherein the first wireless communication system uses wideband code division multiple access (W-CDMA).

23. The apparatus of claim 20, wherein the second wireless communication system is a 3GPP long term evolution (LTE) system.

24. The apparatus of claim 23, wherein the plurality of power estimates is obtained by sampling the input signal over a period of time corresponding to a symbol duration of the LTE system.

25. The apparatus of claim 24, wherein the symbol duration is 10 milliseconds.

26. The apparatus of claim 25, wherein the input signal is sampled at a rate of 15 kHz.

27. The apparatus of claim 24, wherein the symbol duration is at least 20 milliseconds.

28. The apparatus of claim 16, further comprising:
means for receiving signals in a plurality of frequency bands the plurality of frequency bands including a first frequency band and a second frequency band adjacent to the first frequency band;
means for determining that a first signal received in the first frequency band was transmitted using a second wireless communication standard other than the first wireless communication standard; and
means for refraining from searching the second frequency band based on a determination that the first signal was transmitted using the second wireless communication standard.

29. The apparatus of claim 16, wherein the input signal comprises at least one of a pilot signal or a synchronization signal.

30. An apparatus for wireless communication, comprising:
a processing system configured to:
generate a peak power to average power ratio (PAPR) from a plurality of power estimates associated with an input signal received by an automatic gain controller (AGC) in a wireless receiver, wherein a first wireless communication standard according to which the input signal was transmitted is unknown when received;
determine that the PAPR associated with the input signal is less than or equal to a threshold ratio;
identify the first wireless communication standard based on a determination that the PAPR associated with the input signal is less than or equal to the threshold ratio; and
provide, based on identifying the first wireless communication standard, a gain-controlled signal associated with the input signal to a correlator, wherein the correlator is configured to identify the input signal in the gain-controlled signal.

31. The apparatus of claim 30, wherein the plurality of power estimates is obtained by sampling the input signal over a period of time corresponding to a symbol duration defined by a wireless communication system.

32. The apparatus of claim 30, wherein the processing system is further configured to:
receive signals in a plurality of frequency bands, the plurality of frequency bands including a first frequency band and a second frequency band adjacent to the first frequency band;
determine that a first signal received in the first frequency band was transmitted using a second wireless communication standard other than the first wireless communication standard; and
refrain from searching the second frequency band based on a determination that the first signal was transmitted using the second wireless communication standard.

33. The apparatus of claim 30, wherein the input signal comprises at least one of a pilot signal or a synchronization signal.

34. A non-transitory computer-readable medium storing computer-executable code, the computer-executable code comprising:
code for generating a peak power to average power ratio (PAPR) from a plurality of power estimates associated with an input signal received by an automatic gain controller (AGC) in a wireless receiver, wherein a first wireless communication standard according to which the input signal was transmitted is unknown when received;

code for determining that the PAPR associated with the input signal is less than or equal to a threshold ratio;

code for identifying the first wireless communication standard based on a determination that the PAPR associated with the input signal is less than or equal to the threshold ratio; and code for providing, based on identifying the first wireless communication standard, a gain-controlled signal associated with the input signal to a correlator, wherein the correlator is configured to identify the input signal in the gain-controlled signal.

35. The computer-readable medium of claim 34, wherein the computer-executable code comprises code for obtaining the plurality of power estimates by sampling the input signal over a period of time corresponding to a symbol duration defined by a wireless communication system.

36. The computer-readable medium of claim 34, wherein the computer-executable code comprises:

code for receiving signals in a plurality of frequency bands, the plurality of frequency bands including a first frequency band and a second frequency band adjacent to the first frequency band;

code for determining that a first signal received in the first frequency band was transmitted using a second wireless communication standard other than the first wireless communication standard; and code for refraining from searching the second frequency band based on a determination that the first signal was transmitted using the second wireless communication standard.

37. The computer-readable medium of claim 34, wherein the input signal comprises at least one of a pilot signal or a synchronization signal.

* * * * *